United States Patent
Tu et al.

(10) Patent No.: US 10,670,735 B2
(45) Date of Patent: Jun. 2, 2020

(54) DETERMINING VEHICLE ORIENTATION FOR ENHANCED NAVIGATION EXPERIENCE

(71) Applicant: Apple Inc., Cupertino, CA (US)

(72) Inventors: Xiaoyuan Tu, Sunnyvale, CA (US); Alexander Singh Alvarado, Sunnyvale, CA (US); Adam Howell, Oakland, CA (US); Anil Kandangath, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 319 days.

(21) Appl. No.: 15/700,400

(22) Filed: Sep. 11, 2017

(65) Prior Publication Data

US 2019/0079199 A1    Mar. 14, 2019

(51) Int. Cl.
| | |
|---|---|
| *G01S 19/45* | (2010.01) |
| *H04W 4/02* | (2018.01) |
| *G01C 21/16* | (2006.01) |
| *G01S 19/39* | (2010.01) |
| *G01C 21/08* | (2006.01) |

(Continued)

(52) U.S. Cl.
CPC ............. *G01S 19/45* (2013.01); *G01C 21/08* (2013.01); *G01C 21/165* (2013.01); *G01C 21/367* (2013.01); *G01S 19/396* (2019.08); *G01S 19/52* (2013.01); *H04W 4/023* (2013.01)

(58) Field of Classification Search
USPC ....................................................... 701/469
See application file for complete search history.

(56) References Cited

U.S. PATENT DOCUMENTS

| | | | |
|---|---|---|---|
| 8,531,180 B2 | 9/2013 | Piemonte et al. | |
| 8,979,023 B1 * | 3/2015 | Wang | ...................... B64C 25/54 |
| | | | 244/100 A |

(Continued)

OTHER PUBLICATIONS

Wu, et al, Gyroscope Calibration via Magnetometer Article in IEEE Sensors Journal • Jun. 2017, DOI: 10.1109/JSEN.2017.2720756 (https://www.researchgate.net/publication/317988489_Gyroscope_Calibration_via_Magnetometer) (hereinafter "Wu").*

(Continued)

*Primary Examiner* — Jean Paul Cass
(74) *Attorney, Agent, or Firm* — DLA Piper LLP US

(57) ABSTRACT

A system and method for improving the accuracy of a user device when generating map/navigation information for display to a user, comprising: obtaining compass heading from a magnetometer of the user device located within a vehicle; adjusting the compass heading based on a mount angle of the user device within the vehicle; obtaining location data from a location sensor of the user device; determining if a course of the vehicle can be reliably determined from the location data; if the course of the vehicle cannot be reliably determined from the location data, determining the orientation of the vehicle using the compass heading but not the course; if the course of the vehicle can be reliably determined from the location data, calculating a course of the vehicle based on the location data and determining the orientation of the vehicle using the course; generating, by a processor, first map/navigation information using the orientation of the vehicle; and displaying, by a processor, the first map/navigation information to the user.

22 Claims, 6 Drawing Sheets

(51) Int. Cl.
*G01C 21/36* (2006.01)
*G01S 19/52* (2010.01)

(56) References Cited

U.S. PATENT DOCUMENTS

| | | | |
|---|---|---|---|
| 9,264,862 B2 | 2/2016 | Tu et al. | |
| 9,448,250 B2* | 9/2016 | Pham | G01C 17/38 |
| 10,168,156 B2* | 1/2019 | Bryant | G01C 21/16 |
| 10,384,602 B1* | 8/2019 | Csabi | B60Q 9/008 |
| 2004/0105264 A1* | 6/2004 | Spero | F21V 23/0471 |
| | | | 362/276 |
| 2004/0254727 A1* | 12/2004 | Ockerse | G01C 17/28 |
| | | | 701/535 |
| 2006/0176372 A1* | 8/2006 | Moriya | G03B 17/00 |
| | | | 348/208.4 |
| 2008/0255722 A1* | 10/2008 | McClellan | B60R 25/102 |
| | | | 701/31.4 |
| 2009/0275281 A1* | 11/2009 | Rosen | H04K 3/415 |
| | | | 455/1 |
| 2010/0228405 A1* | 9/2010 | Morgal | B62H 3/02 |
| | | | 701/2 |
| 2012/0206050 A1* | 8/2012 | Spero | H05B 3/008 |
| | | | 315/152 |
| 2014/0139451 A1* | 5/2014 | Levesque | G06F 3/0416 |
| | | | 345/173 |
| 2015/0193885 A1* | 7/2015 | Akiva | G06Q 40/08 |
| | | | 705/4 |
| 2015/0269841 A1* | 9/2015 | Makowitz | G08G 1/096791 |
| | | | 348/149 |
| 2015/0281884 A1* | 10/2015 | Smith | H04W 4/029 |
| | | | 455/456.3 |
| 2016/0031506 A1* | 2/2016 | Lloyd | B60L 53/60 |
| | | | 701/49 |
| 2016/0088146 A1* | 3/2016 | Ying | H04W 4/027 |
| | | | 455/550.1 |
| 2016/0139241 A1* | 5/2016 | Holz | H04B 17/318 |
| | | | 367/128 |
| 2016/0248914 A1* | 8/2016 | Lacey | H04M 3/42008 |
| 2016/0262191 A1* | 9/2016 | Flynn | H04W 76/10 |
| 2016/0288707 A1* | 10/2016 | Matsumura | B60Q 9/00 |
| 2016/0327407 A1* | 11/2016 | Park | G01P 15/00 |
| 2016/0366330 A1* | 12/2016 | Boliek | G06F 16/7867 |
| 2017/0174227 A1* | 6/2017 | Tatourian | G06K 9/3241 |
| 2017/0211936 A1 | 7/2017 | Howell et al. | |
| 2017/0349058 A1* | 12/2017 | Bernier | H02J 13/00001 |
| 2019/0169979 A1* | 6/2019 | Nguyen | E21B 47/09 |
| 2019/0172165 A1* | 6/2019 | Verteletskyi | G05B 19/042 |
| 2019/0182415 A1* | 6/2019 | Sivan | G06F 3/012 |
| 2019/0270459 A1* | 9/2019 | Williams | H04M 1/72569 |

OTHER PUBLICATIONS

DWI, Object Visualization Using Maps Marker Based On Augmented Reality (2018).*

* cited by examiner

DETERMINING VEHICLE ORIENTATION FOR ENHANCED NAVIGATION EXPERIENCE

BACKGROUND

A mobile user device (or "user device") such as a smartphone, tablet, or wearable device may be equipped with a compass. The compass can calculate and provide its user with a direction, which may be a "heading" (typically given relative to the Earth's magnetic field), and/or an arrow pointing to true north. A navigation/map application running on the device may use the compass to display the user's heading and/or to calculate navigation instructions. For example, a mobile device may run a navigation/mapping application that receives, as input from the user, a destination location and provides turn-by-turn driving instructions to the user. To correctly calculate the next driving instruction, a user device needs to know the forward direction of the vehicle (referred to herein as the "vehicle orientation") among other information. Existing devices/applications may rely on compass heading to determine vehicle orientation.

A compass can obtain a measure of the magnetic field that is present in its immediate surrounding as a three-component (e.g., in x, y, and z directions) vector, using a 3-axis magnetic sensor called a magnetometer. The sensed field contains a contribution by the Earth's magnetic field, and a contribution by a local interference field. The latter is the magnetic field that is created by components in the local environment of the mobile device, and can include hard and soft iron components. Hard iron refers to magnetic materials that are difficult to magnetize, but once magnetized will retain the magnetism for long periods of time. Soft iron refers to metals that are easily magnetized, but lose their magnetic state once the magnetizing force is removed. These local magnetic effects may include contributions by any magnetic component that is near the sensor, such as a loudspeaker that is built into the device. The interference field may also have a contribution due to magnetic elements found in the external environment close to the device, such as when the user is driving an automobile, riding in a train or bus, or riding on a bicycle or motorcycle.

In addition to a magnetometer, a user device may include various other motion sensors such as an accelerometer and gyroscope, along with a Global Positioning Satellite (GPS) receiver or similar location sensor.

SUMMARY

It is recognized herein that existing user devices/applications may provide incorrect map and navigation information when used inside a vehicle or other "magnetically challenged" environment. For example, if a user is driving north on a certain road, a map application that relies on a compass heading may display the device/vehicle orientation as north-northwest due to interference from the metal body of the vehicle. As another example, existing devices/applications may provide incorrect or roundabout turn-by-turn driving instructions if compass heading is degraded.

Described herein are embodiments of systems and methods for determining device/vehicle orientation by "fusing" compass heading and course. Course can be calculated by tracking the vehicle's location over time. Course may be used to correct the compass heading if the vehicle is traveling above a certain speed and there is a sufficiently strong location signal (e.g., GPS signal). At lower speeds, or if the location signal is weak such as in an urban canyon, compass heading may be used alone. If both course and heading are degraded, inertial motion data from an accelerometer and gyroscope may be used to "coast" vehicle orientation by tracking turns. Embodiments of the present disclosure can be used to display a more accurate representation of the device/vehicle heading, and provide more accurate/efficient driving instructions to the user. Various other embodiments are also described herein.

According to an aspect of the present disclosure, a method is provided for improving the accuracy of a user device when generating map/navigation information for display to a user. The method comprises obtaining compass heading from a magnetometer of the user device located within a vehicle; adjusting the compass heading based on a mount angle of the user device within the vehicle; obtaining location data from a location sensor of the user device; determining if a course of the vehicle can be reliably determined from the location data; if the course of the vehicle cannot be reliably determined from the location data, determining the orientation of the vehicle using the compass heading but not the course; if the course of the vehicle can be reliably determined from the location data, calculating a course of the vehicle based on the location data and determining the orientation of the vehicle using the course; generating, by a processor, first map/navigation information using the orientation of the vehicle; and displaying, by a processor, the first map/navigation information to the user.

In some embodiments, determining if the course of the vehicle can be reliably determined from the location data comprises: determining a speed of the vehicle using motion data from the user device; and comparing the speed of the vehicle to a predetermined speed threshold. In certain embodiments, determining if the course of the vehicle can be reliably determined from the location data comprises: determining a course accuracy associated with the location sensor; and comparing the course accuracy to a predetermined course accuracy threshold.

In one or more embodiments, the method further comprising calculating an updated mount angle of the user device based on the compass heading and the course, wherein adjusting the compass heading based on the mount angle comprises adjusting the compass heading based on the updated mount angle. In particular embodiments, the method further comprises determining an accuracy of the compass heading; and if the accuracy of the compass heading is below a predetermined compass accuracy threshold: obtaining angular rate data from a gyroscope of the user device, and updating the orientation of the vehicle using the angular rate data.

In some embodiments, determining the orientation of the vehicle using the compass heading and the course comprises using the course to provide corrections to an Extended Kalman Filter (EKF) used to estimate heading over time. In certain embodiments, generating the first map/navigation information comprises generating a graphical representation of the vehicle's heading. In particular embodiments, generating the first map/navigation information comprises generating turn-by-turn navigation instructions. In one or more embodiments, the method further comprises: detecting the user device was removed from the vehicle; determining the location of the vehicle using the location data; recording the orientation and the location of the vehicle to a memory of the user device in response to detecting the user device was removed from the vehicle; detecting the user device is mounted within the vehicle; and using the recorded orientation and location of the vehicle to generate and display second map/navigation information subsequent to detecting the user device is mounted within a vehicle.

In some embodiments, detecting the user device is mounted within the vehicle comprises detecting the user is driving the vehicle. In particular embodiments, detecting the user is driving the vehicle comprises: determining a speed of the vehicle using motion or location data from the user device; and determining an arm position of the user based on motion data from a wearable device configured to be worn on an arm of the user. In certain embodiments, the user device and the wearable device are different devices. In particular embodiments, detecting the user is driving the vehicle further comprises determining if the user device is connected to a wireless network of the vehicle. In some embodiments, the method further comprises disabling user functionality of the user device in response to detecting the user device is situated within a moving vehicle.

According to another aspect of the present disclosure, a user device is provided with improved accuracy when generating map/navigation information for display to a user. The user device comprises: a magnetometer configured to generate compass heading of the user device; a location sensor configured to generate location data of the user device; and a processor circuit in communication with the magnetometer and the location sensor. The processor circuit may be configured to execute instructions causing the processor circuits to perform embodiments of the method described hereinabove.

Other features and advantages will become apparent from the following detailed description and drawings.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
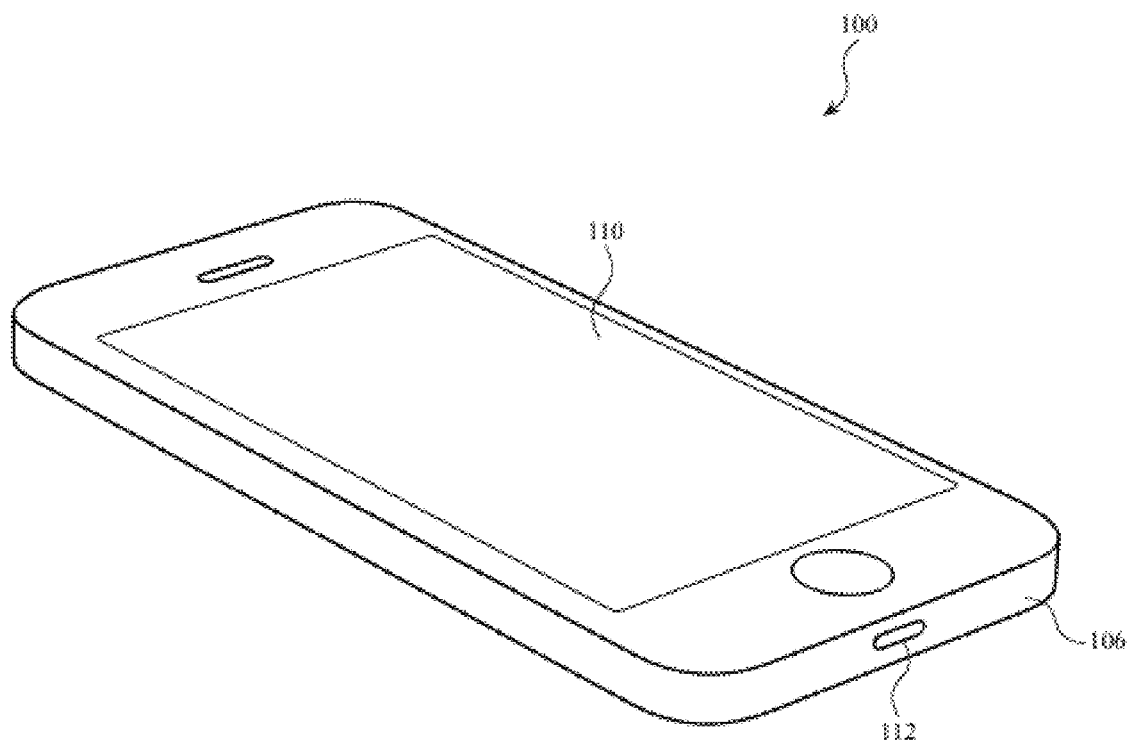
FIG. 1 is a diagram of a user device in accordance with an embodiment of the present disclosure.

FIG. 1 shows an example of a user device 100 in accordance with an embodiment of the present disclosure. The illustrative user device 100 includes a body structure 106, a touchscreen display 110, and an input-output (I/O) port 112. In some embodiments, the user device 100 may be a smartphone, tablet computer, wearable computing device, or other type of portable computing device. The display 100 may be a screen, such as a crystalline (e.g., sapphire) or glass touchscreen, configured to provide output to the user as well as receive input from the user via touch.

The user device 100 may be mounted within a vehicle, meaning that the device's orientation is relatively stable or fixed with respect to the vehicle. For example, user device 100 may be mounted onto the dashboard of the vehicle, or may simply be resting in a cup holder, which can also be considered to be a mounted state.

The user device 100 may be configured to run map and navigation applications to rely on sensors within the device to determine the device/vehicle heading. The device/vehicle heading may be, in turn, displayed to the user and/or used to calculate and display turn-by-turn navigation instructions. In many embodiments the user device 100 uses techniques described below to provide enhanced mapping and navigation functionality.

Figure 2:
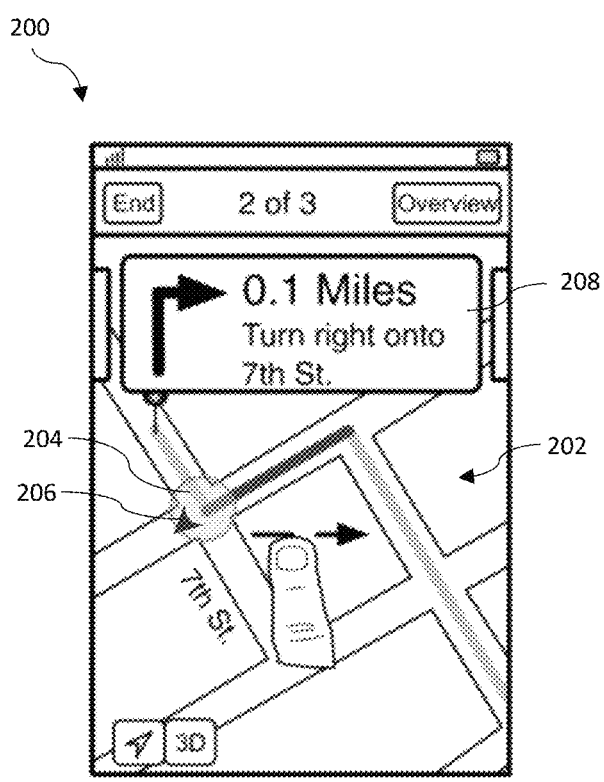
FIG. 2 is a diagram of an illustrative user interface (UI) for presenting maps and navigation instructions, in accordance with an embodiment of the present disclosure.

FIG. 2 shows a user interface (UI) 200 for displaying device/vehicle heading and driving instructions, in accordance with some embodiments. The illustrative UI 200 may form a part of a map/navigation application that runs on a user device (e.g., user device 100 of FIG. 1). The UI 200 includes a street map 202, location indicator 204, heading indicator 206, and navigation instructions 208. The heading indicator 206 may be an arrow-shaped graphic that points to the direction of travel relative to the street map 202 onto which it is overlaid. Navigation instructions 208 display turn-by-turn of navigation instructions 202, e.g., "Turn right onto 7th St." The navigation instructions may be calculated based on the device's current location, a destination location selected by the user, and current vehicle orientation. Thus, the accuracy and quality of information presented within a map/navigation application, such as shown in FIG. 2, depends on the accuracy with which vehicle orientation can be calculated by the device.

Figure 3:
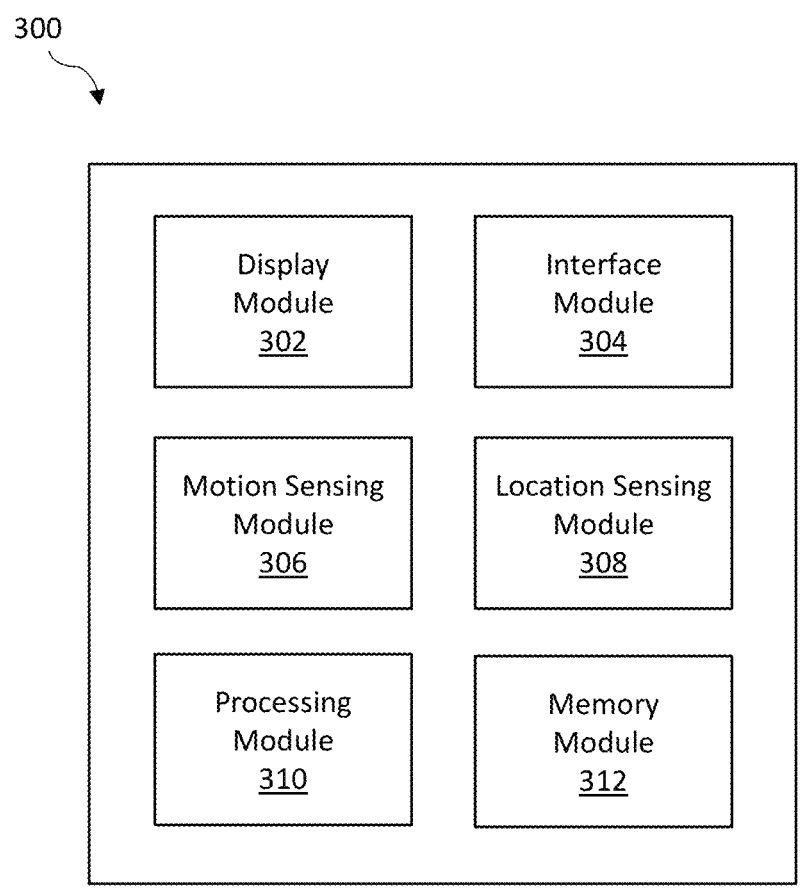
FIG. 3 is a block diagram showing components that may be found within a user device, in accordance with an embodiment of the present disclosure.

FIG. 3 shows various components 300 that may be found within a user device (e.g., user device 100 of FIG. 1), according to an embodiment of the present disclosure. The illustrative components 300 include a display module 302, interface module 304, motion sensing module 306, location module 308, processing module 310, and memory module 312.

Display module 302 may be a screen, such as a crystalline (e.g., sapphire) or glass touchscreen, configured to provide output to the user as well as receive input from the user via touch. For example, display module 302 may display a UI for turn-by-turn navigation instructions. In some embodiments, a user device may present output to a user in other ways, such as by producing sound with a speaker (not shown), and the user device may receive input from the user in other ways, such as by receiving voice commands via a microphone (not shown).

Interface module 304 may include one or more interfaces for communicating with external devices. In many embodiments, interface module 304 includes one or more wireless interfaces, such as a Bluetooth interface, a cellphone network protocol such as LTE, or a Wi-Fi (IEEE 802.11) interface. In one or more embodiments, interface module 230 may include wired interfaces, such as a headphone jack or bus connector (e.g., Lightning, Thunderbolt, USB, etc.).

Motion sensing module 306 may include one or more motion sensors, such as an accelerometer, gyroscope, and magnetometer. In some embodiments, the accelerometer may be a three-axis, microelectromechanical system (MEMS) accelerometer, the gyroscope may be a three-axis MEMS gyroscope, and the magnetometer may be a three-axis magnetometer. A microprocessor (not shown) or motion coprocessor (not shown) of the user device may receive motion information from the motion sensors of the motion sensing module 306 to track acceleration, rotation, position, or orientation information of the user device in six degrees of freedom through three-dimensional space. Motion data such as accelerometer or gyroscope data may be filtered (e.g. by a high-pass, low-pass, band-pass, or band-stop filter) in order to improve its quality. Location module 308 may include a Global Positioning Satellite (GPS) receiver or other type of location sensor.

Processing module 310 may correspond to one or more microprocessors for processing motion data, location data, other information in a user device, and for executing instructions for firmware or apps stored in a non-transitory processor-readable medium such as memory module 312. Memory module 312 may include volatile and non-volatile memory (e.g., flash memory).

In some embodiments, vehicle orientation may be determined using a combination of motion data obtained from motion sensing module 306 and location data obtained from location sensing module 308. For example, compass heading obtained from motion sensors 306 may "fused" with course information obtained from a location sensor 308 to determine vehicle orientation. The vehicle orientation may be provided to map and navigation applications that execute using processing module 310 and displays information to a user via display module 302. In one or more embodiments, vehicle orientation may be stored in non-volatile memory 312 and later used in situations where both compass heading and course are degraded, e.g., when the user launches the map/navigation application inside their parked vehicle.

In certain embodiments, motion data from module 306 may be used to detect when the user device is mounted within a vehicle, or removed from its mount. In some embodiments, motion data from motion sensing module 306 (e.g., pedestrian motion data) and/or data obtained from interface module 304 (e.g., paired Bluetooth or Wi-Fi connection status) may be used to detect a "vehicular exit," meaning that the device has been removed from a vehicle.

The modules 300 shown in FIG. 3 and described above are examples, and embodiments of a user device may include other modules not shown. For example, one or more embodiments of a user device may include a rechargeable battery (e.g., a lithium-ion battery), a microphone or a microphone array, one or more cameras, or one or more speakers.

Figure 4:
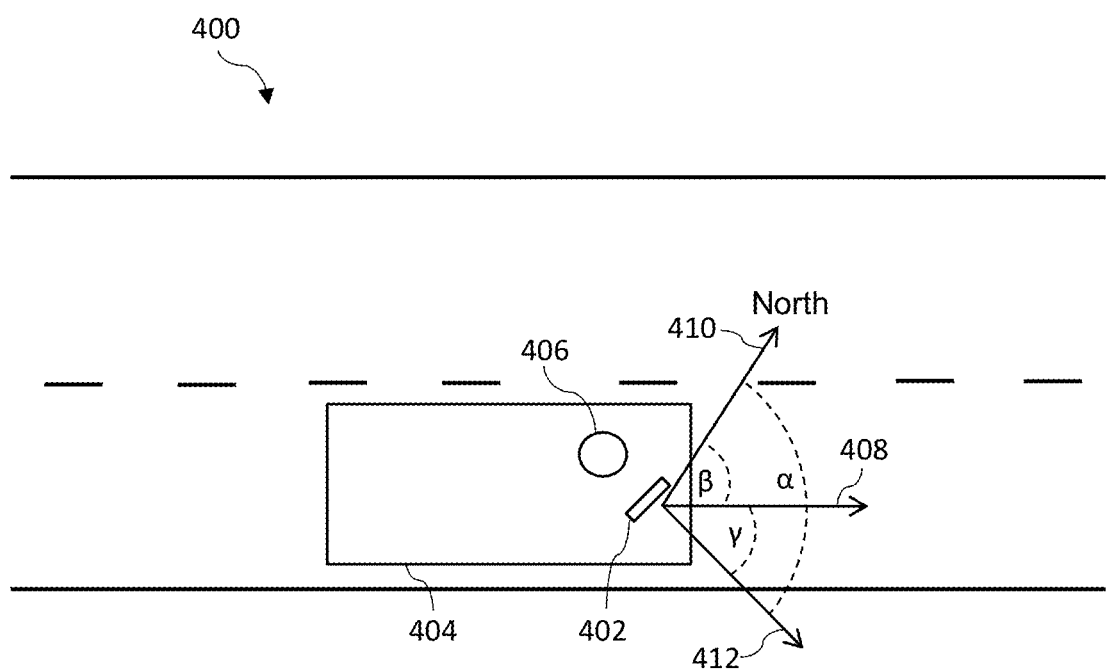
FIG. 4 is a top view diagram showing a user device mounted within a vehicle, in accordance with an embodiment of the present disclosure.

FIG. 4 shows an example 400 of a user device 402 mounted within a vehicle 404, according to an embodiment of the present disclosure. The forward direction of the vehicle (i.e., the "vehicle orientation") is indicated by arrow 408. The user device 402 includes a magnetometer to determine compass heading, indicated by arrow 412, which is relative to the orientation of the device itself. For example, in the case of a smartphone or tablet, compass heading 412 may correspond to the direction in which the back side of the device is facing (e.g., the side opposite from the device's touchscreen display 110 in FIG. 1).

Compass heading 412 and vehicle orientation 408 may be expressed as angle offsets ($\alpha$ and $\beta$ respectively in FIG. 4) from true/magnetic North 410. In general, vehicle orientation 408 and compass heading 412 may differ depending on how the user device 402 is mounted within the vehicle 404. For example, as illustrated in FIG. 4, user device 402 may be angled to face the vehicle's driver 406. The difference between compass heading 412 and vehicle orientation 408 is referred to herein as the "mount angle" ($\gamma$ in FIG. 4). In some embodiments, the device mount angle can be calculated using compass heading and course if both values are known to be reliable. In certain embodiments, a known mount angle can be used to enhance the quality of map/navigation information presented to the user, as discussed further below.

Figure 5:
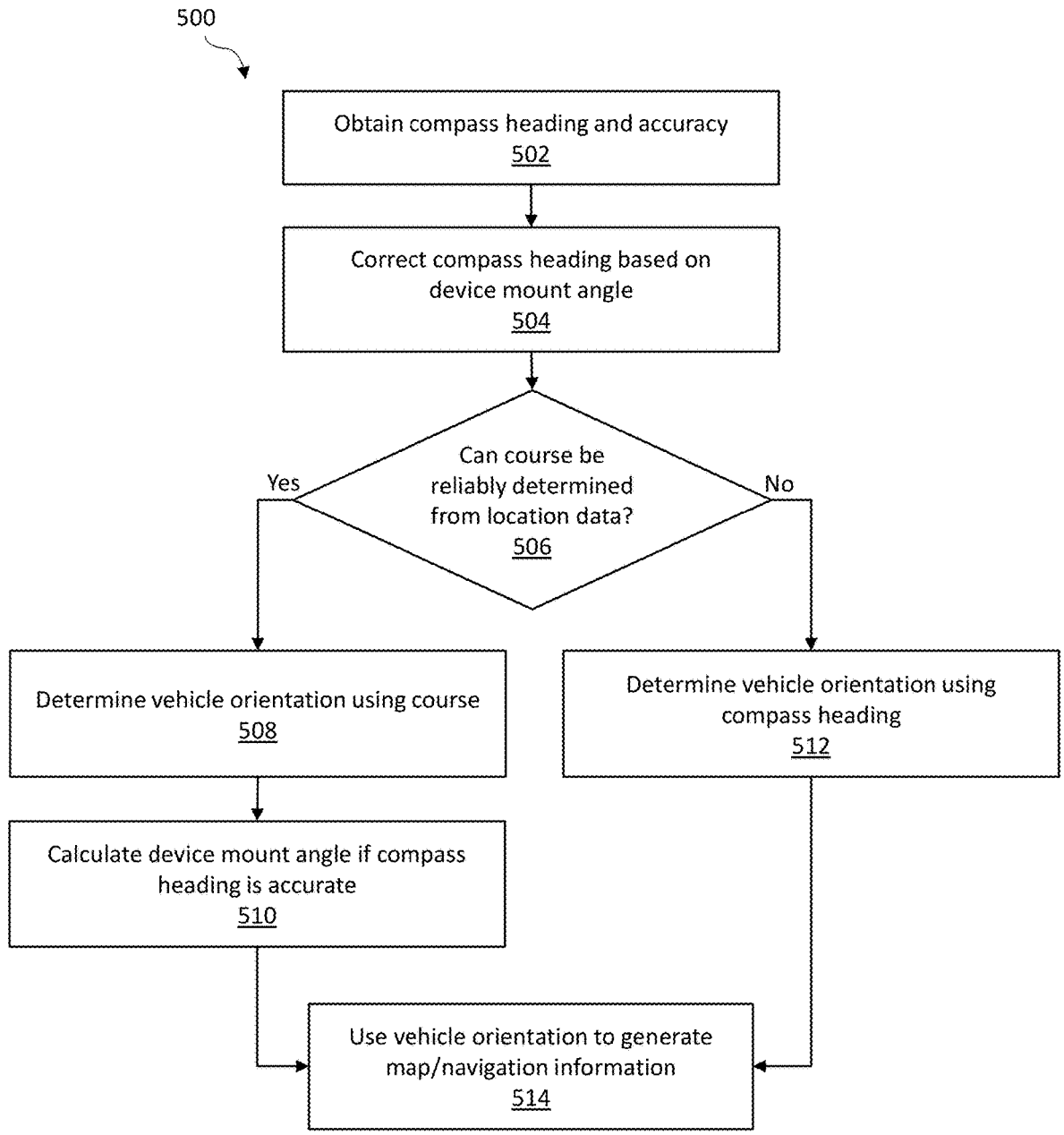
FIG. 5 is a flow diagram showing a method for determining vehicle orientation using compass heading and course, according to an embodiment of the present disclosure.
Figure 6:
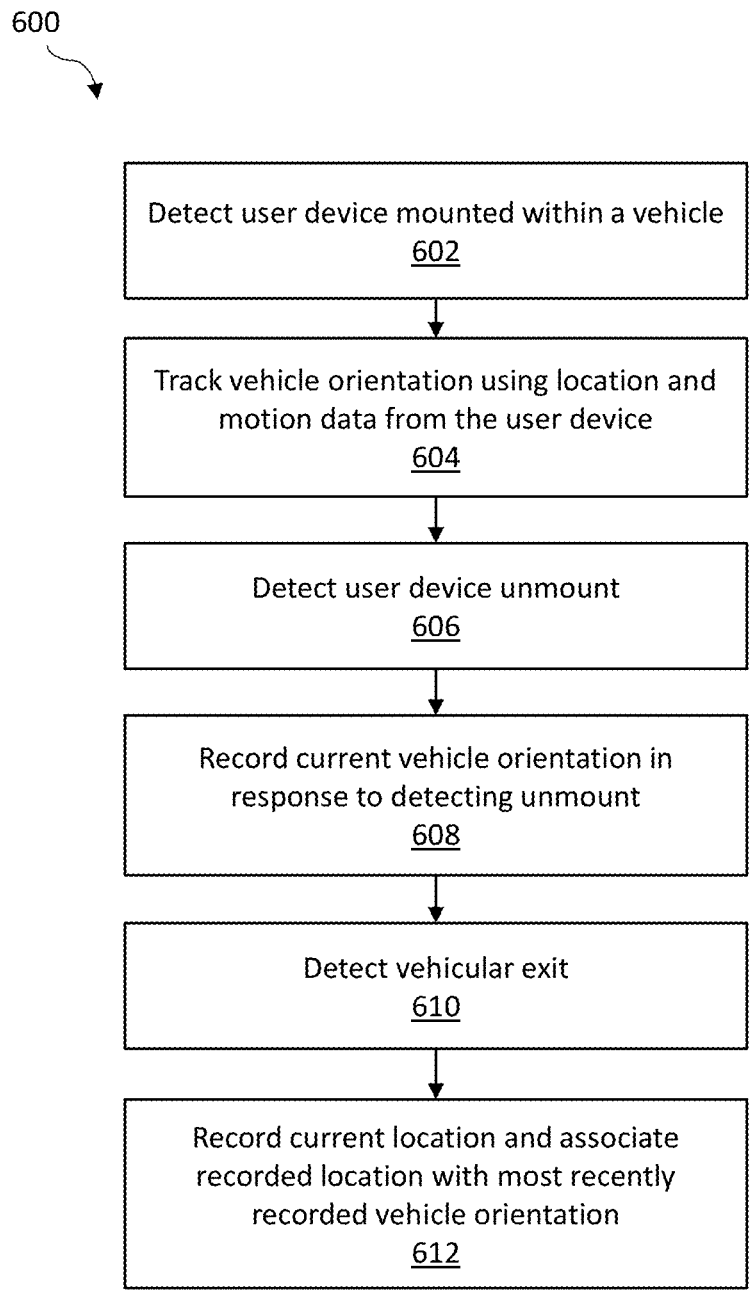
FIG. 6 is a flow diagram illustrating a method for tracking and recording vehicle orientation within a user device, according to an embodiment of the present disclosure.
Figure 7:
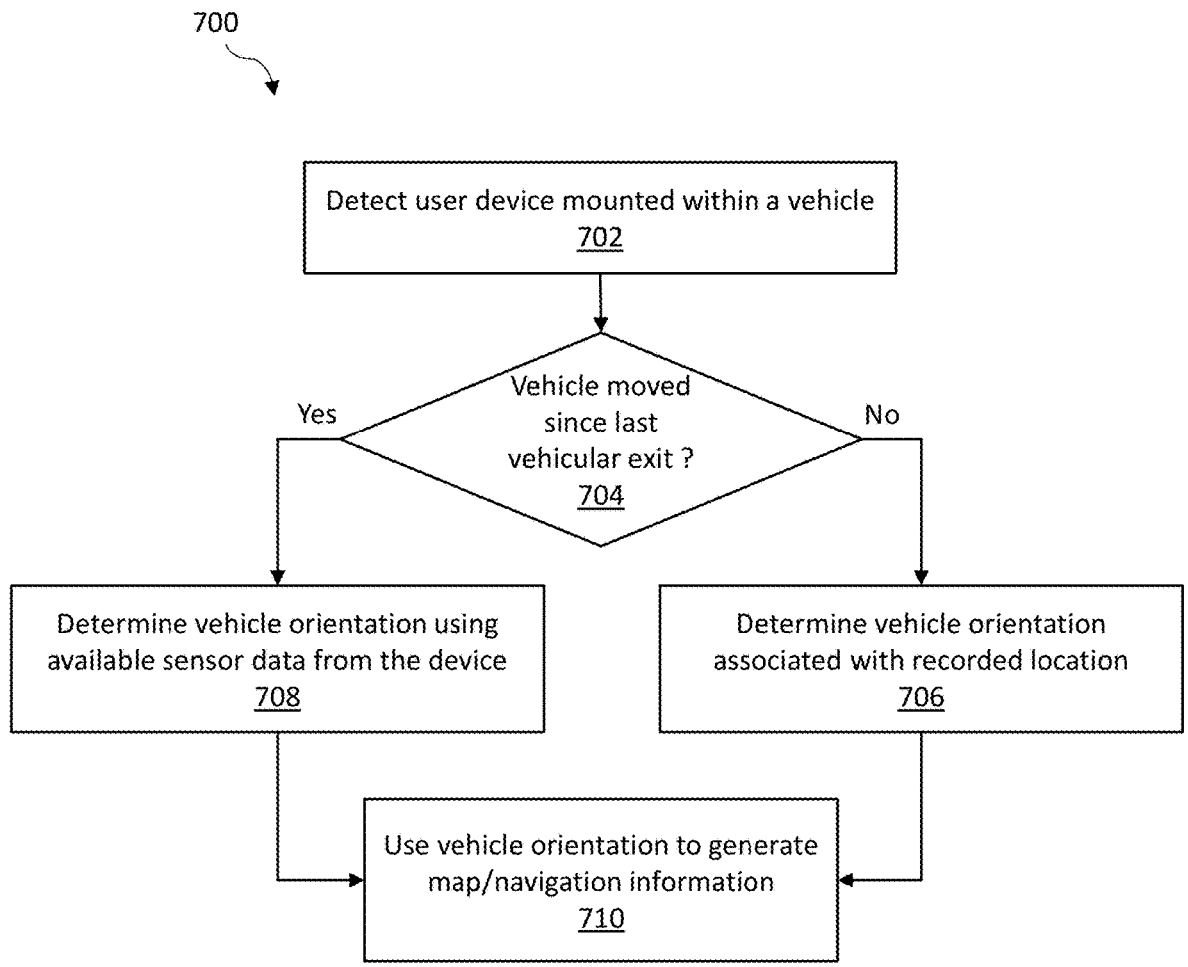
FIG. 7 a flow diagram illustrating a method for enhancing vehicle navigation instructions using previously recorded vehicle orientation information, according to an embodiment of the present disclosure.

FIGS. 5-7 are flow diagrams of illustrative methods, according to embodiments of the present disclosure. Some or all of the processing shown in the flow diagrams and described herein may be implemented within, or performed by, a user device (e.g., user device 100 of FIG. 1). Elements (or "blocks") shown within the flow diagrams may represent computer software instructions and/or steps performed by functionally equivalent circuits such as a digital signal processor (DSP) circuit or an application specific integrated circuit (ASIC). The flow diagrams do not depict the syntax of any particular programming language but rather illustrate functional information one of ordinary skill in the art requires to fabricate circuits or to generate computer software to perform the described processing. Blocks within a flow diagram are unordered, meaning that the functions represented by the blocks can be performed in any convenient or desirable order. In some embodiments, blocks from a particular flow diagram may be performed in combination with blocks from one or more different flow diagrams.

FIG. 5 shows an illustrative method 500 for determining vehicle orientation using compass heading and course, according to an embodiment of the present disclosure. The method 500 may be performed by a user device mounted within the vehicle. In one or more embodiments, method 500 may be repeated frequently in order to track vehicle orientation in a continuous manner.

At block 502, compass heading is obtained from the device's magnetometer. The accuracy of the compass heading can also be determined. In some embodiments, compass accuracy is determined using techniques described in U.S. Pat. Pub. No. 2017/0211936 entitled "Always on Compass Calibration Systems and Methods," which is hereby incorporated by reference in its entirety.

At block 504, if the device's mount angle is known, it can be used to adjust (or "correct") the compass heading such that it reflects the vehicle's heading instead of the devices heading. For example, the mount angle may be added to, or subtracted from the compass heading. Initially, the device mount angle may be unknown, in which case block 504 may be skipped. In other embodiments, if the device mount angle is unknown, then it may be defaulted to a pre-determined value (e.g., 0 degrees or 10 degrees).

At block 506, a determination is made as to the vehicle's course can be reliably calculated using available location data (e.g., GPS data). Course may degrade if the vehicle is slow moving or if the location sensor cannot obtain a strong signal. For example, GPS signal strength may degrade within urban canyons, parking structures, and other environments. Accordingly, in certain embodiments, course can be reliably determined when (a) the vehicle speed is greater than a predetermined speed threshold and/or (b) if GPS course accuracy (measured as degree angle error from True North) is less than a predetermined course accuracy threshold. In certain embodiments, the speed threshold is about 1 meter/second and the course accuracy threshold is about 45 degrees. The vehicle speed may be determined using motion data and/or location data from the device.

If course can be reliably determined, then, at block 508, the vehicle orientation may be tracked using course to provide heading corrections. In some embodiments, course may be used to "correct" compass heading by estimating the mount angle as a constant offset between the two heading vectors (i.e., compass and course) in a given frame of reference (e.g., a Body or an Inertial frame). In certain embodiments, an Extended Kalman Filter (EKF) may be used to estimate device/vehicle attitude over time. In such embodiments, heading and course may be "fused" together in the attitude estimator EKF to determine the vehicle's orientation over time. The attitude estimator could use compass heading to provide corrections when course is not reliable, and vice versa.

At block 510, if both course and compass heading are known to be reliable, then the device mount angle may be calculated as the angular difference between course and heading. In some embodiments, compass accuracy (determined at block 504) may be expressed as a numeric value, such as in degrees. As such, the compass accuracy may be compared to a predetermined compass accuracy threshold (e.g., about +/−25 degrees) to determine if heading is sufficiently reliable to be used to calculate mount angle. In other embodiments, mount angle may be determined using techniques described in U.S. Pat. No. 9,448,250, entitled "Detecting Mount Angle of a Mobile Device in Vehicle Using Motion Sensors," which is incorporated by reference in its entirety.

If course cannot be reliably determined, then, at block 512, vehicle orientation may be determined using only the compass heading or, in some cases, the compass heading adjusted based on the mount angle if direction-of-travel is desired as opposed to device heading.

At block 514, the vehicle orientation (determined at block 508 or 512) may be used to generate map/navigation information for displaying to a user. For example, vehicle orientation may be used to display a device/vehicle heading indicator on a map (e.g., indicator 206 in FIG. 2), and/or to calculate turn-by-turn driving instructions (e.g., instructions 208 in FIG. 2).

In some embodiments, if both heading and course are determined to be unreliable—such as may be the case if the vehicle is moving slowly within a garage—then inertial motion data from the device may be used to update (or "coast") a previously determined vehicle orientation. For example, angular rate obtained from the gyroscope may be used to track vehicle turns when there is too much uncertainty in heading and course. In some embodiments, coasting is performed using techniques described in U.S. Pat. No. 8,531,180 entitled "Determining heading using magnetometer data and angular rate data," which is hereby incorporated by reference in its entirety.

FIG. 6 shows an illustrative method 600 for tracking and recording vehicle orientation within a user device, according to an embodiment of the present disclosure. Method 600 of FIG. 6 may be used in conjunction with method 700 of FIG. 7 to enhance the quality of map/navigation information presented to a user.

At block 602, a determination may be made that the device is mounted within the vehicle. In some embodiments, this includes using accelerometer and/or gyroscope data to determine if the device has a certain orientation and/or whether the device's orientation is stable over time. In one or more embodiments, block 602 may include detecting that the user device is connected to a wireless network of the vehicle, such as a Bluetooth or Wi-Fi network associated with the vehicle, which may indicate the device is situated within the vehicle.

In some embodiments, method 600 may further include determining that the user is driving the vehicle. This can be used, for example, to improve the quality of map/navigation information presented to the user, or to disable functionality of the user device for safety reasons while the user is driving. In some embodiments, a combination of vehicle speed and motion data may be used to determine the user is driving. In particular, motion data (e.g., accelerator data) from a wearable device on the user's wrist can be used to determine if the user's pose angle is consistent with a person handling a steering wheel. The wearable device and the user device may be the same device or separate devices in wireless communication with each other. Vehicle speed can be determined using location or motion data from the user device. Because vehicle speed may drop to zero when the user is driving (e.g., at a traffic signal), both arm position and vehicle speed may be used to detect driving. In some embodiments, detecting the user is driving may include using one or more techniques described in U.S. Prov. Patent Application Ser. No. 62/507,115, filed on May 16, 2017, entitled "Operational Safety Mode," which is incorporated herein by reference in its entirety.

If it is determined that the user is driving, various features of the user device or wearable device may be disabled. In some embodiments, step counts and stand reminders may be disabled on the wearable device while the user is driving. In certain embodiments, certain user input functionality (e.g., the ability for the user to enter text on a touch screen) may be disabled on the user device and/or wearable device while the user is driving.

At block 604, vehicle orientation is calculated and may be tracked in a continuous manner. In some embodiments, vehicle orientation is determined using both compass heading and course, such as described above in conjunction with FIG. 5. In certain embodiments, mount angle may also be determined using compass heading and course.

At block 606, a detection is made that the user device has been unmounted from the vehicle, such as when the user picks up the device prior to exiting the vehicle. In many embodiments, the unmount state is determined using motion data from the device.

At block 608, in response to detecting that the device was unmounted, the last known vehicle orientation may be recorded to the device's non-volatile memory. In certain embodiments, vehicle orientation may be stored as an angle offset from true/magnetic North (referred to as a "north offset"). In some embodiments, the mount angle (if known) may also be recorded.

At block 610, a vehicular exit is detected, meaning that the device has been removed from the vehicle. In some embodiments, vehicular exit is detected based on detecting that the user device has disconnected from a wireless network associated with the vehicle, such as in-vehicle Bluetooth or Wi-Fi. In certain embodiments, vehicular exit may be detected based on sensed pedestrian activity, for example, using techniques described in U.S. Pat. No. 9,264,862, issued on Feb. 16, 2016, and entitled "Determining exit from a vehicle," which is hereby incorporated by reference in its entirety. In particular embodiments, a combination of one or more of the preceding techniques may be used to detect vehicular exit.

In some embodiments, for vehicles that introduce significant magnetic interference (e.g. compass observes significantly different local magnetic field strength to that of Earth), this information may be used to detect the user entered/existing the vehicle. In particular, when a vehicular entrance/exit is detected using one or more techniques described above (e.g., using Bluetooth or Wi-Fi connection status), the observed magnetic field strength within the vehicle can be recorded. Later, if the same or similar magnetic field strength is observed in conjunction with certain motion data, then a vehicular entrance/exit may be detected without relying on, for example, paired Bluetooth or Wi-Fi connection status.

At block 612, in response to detecting a vehicular exit, the device's current location is recorded and associated with the previously recorded vehicle orientation (i.e., the vehicle orientation recorded at block 608). In one or more embodiments, the current location and vehicle orientation may be stored together in non-volatile memory. As discussed below, the recorded values may be used to enhance the quality of information presented to the user if the user later launches a map/navigation application from the same location.

As discussed above, functionality of the user device and/or a wearable device may be disabled while the user is driving for safety reasons, according to some embodiments. Accordingly, such functionality may be restored in response to detecting a vehicular exit.

FIG. 7 shows an illustrative method 700 for enhancing map/navigation information using previously recorded vehicle orientation and location data, according to an embodiment of the present disclosure.

At block 702, a determination is made that the user device is mounted within a vehicle using, for example, a technique discussed above in conjunction with block 602 of FIG. 6.

At block 704, a determination is made as to whether the vehicle was moved since the last vehicular exit was recorded (e.g., at block 612 of FIG. 6). In some embodiments, the device's current location is compared to the location recorded at the last vehicular exit. For example, it may be determined that the vehicle was moved if either longitude or latitude have changed by more than location threshold values. The location threshold values may be dependent on the accuracy of the location sensor, which is usually given in feet or meters. In some embodiments, the location threshold values may be a multiple of the location sensor accuracy, e.g., 2× the location accuracy. Other techniques may be used to determine if the vehicle was moved. For example, in some embodiments, detection of a paired Bluetooth/Wi-Fi connection, vehicle GPS data, wheel tick data, and/or other vehicle sensor data may be used to determine if the vehicle was moved after the last vehicular exit.

If the vehicle was not moved, then, at block 706, the current vehicle orientation may be defaulted to the previous vehicle orientation. This is based on the assumption that, if a vehicle has not been moved since the last vehicular exit, then the vehicle's orientation should not have changed. For example, at the start of a navigation session, it may be the case that the vehicle has not moved sufficiently either to gain compass calibration or meet the necessary conditions to use GPS course. In these cases, the previously recorded vehicle orientation may be used to initialize the vehicle's heading on a map and/or to calculate turn-by-turn driving instructions, providing a better user experience for navigation.

If the vehicle was moved, then, at block 708, the recorded vehicle orientation may be discarded and the current vehicle orientation may be determined using available sensor data from the device, such as described above in conjunction with FIG. 5.

At block 710, the vehicle orientation (determined at block 706 or 708) may be used to enhance the quality of map/navigation information presented to a user. For example, vehicle orientation may be used to display a device/vehicle heading indicator on a map (e.g., indicator 206 in FIG. 2), and/or to calculate turn-by-turn driving instructions (e.g., instructions 208 in FIG. 2).

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes.

Methods described herein may represent processing that occurs within a wearable device (e.g., device 100 of FIG. 1) and/or within a companion device (e.g., device 300 of FIG. 3). In many embodiments, processing may be performed by a processor circuit within the wearable/companion device. In some embodiments, processing may be performed using computer software instructions executed upon a computer processor. In particular embodiments, the computer software instructions may be provided on a non-transitory computer-readable medium. In certain embodiments, processing may be performed using a digital signal processor (DSP) circuit or an application specific integrated circuit (ASIC).

What is claimed is:

1. A method for improving the accuracy of a user device when generating map/navigation information for display to a user, the method comprising:
    obtaining a compass heading from a magnetometer of the user device located within a vehicle;
    adding or subtracting a mount angle of the user device within the vehicle to the compass heading, thereby producing a corrected compass heading;
    obtaining location data from a location sensor of the user device;
    determining that a course of the vehicle cannot be reliably determined from the location data;
    in response to the determining that the course of the vehicle cannot be reliably determined from the location data, determining the orientation of the vehicle using the corrected compass heading but not the course;
    generating, by a processor, first map/navigation information using the orientation of the vehicle; and
    displaying, by a processor, the first map/navigation information to the user.

2. The method of claim 1 wherein determining that the course of the vehicle cannot be reliably determined from the location data comprises:
    determining a speed of the vehicle using motion data from the user device; and
    comparing the speed of the vehicle to a predetermined speed threshold.

3. The method of claim 1 wherein determining that the course of the vehicle cannot be reliably determined from the location data comprises:
    determining a course accuracy associated with the location sensor; and
    comparing the course accuracy to a predetermined course accuracy threshold.

4. The method of claim 1 further comprising:
calculating an updated mount angle of the user device within the vehicle based on the compass heading and the course; and
adding or subtracting the updated mount angle of the user device within the vehicle to the compass heading, thereby producing an updated corrected compass heading.

5. The method of claim 1 further comprising:
determining an accuracy of the compass heading;
determining that the accuracy of the compass heading is below a predetermined compass accuracy threshold; and
in response to the determining that the accuracy of the compass heading is below the predetermined compass accuracy threshold:
obtaining angular rate data from a gyroscope of the user device; and
updating the orientation of the vehicle using the angular rate data.

6. The method of claim 1 wherein generating the first map/navigation information comprises generating a graphical representation of the vehicle's heading.

7. The method of claim 1 wherein generating the first map/navigation information comprises generating turn-by-turn navigation instructions.

8. The method of claim 1 further comprising:
detecting the user device was removed from the vehicle;
determining the location of the vehicle using the location data;
recording the orientation and the location of the vehicle to a memory of the user device in response to detecting the user device was removed from the vehicle;
detecting the user device is mounted within the vehicle; and
using the recorded orientation and location of the vehicle to generate and display second map/navigation information subsequent to detecting the user device is mounted within a vehicle.

9. The method of claim 8 wherein detecting the user device is mounted within the vehicle comprises detecting the user is driving the vehicle.

10. The method of claim 9 wherein detecting the user is driving the vehicle comprises:
determining a speed of the vehicle using motion or location data from the user device; and
determining an arm position of the user based on motion data from a wearable device configured to be worn on an arm of the user.

11. The method of claim 10 wherein the user device and the wearable device are different devices.

12. The method of claim 10 wherein detecting the user is driving the vehicle further comprises determining if the user device is connected to a wireless network of the vehicle.

13. The method of claim 9 further comprising disabling user functionality of the user device in response to detecting the user device is situated within a moving vehicle.

14. A user device with improved accuracy when generating map/navigation information for display to a user, the user device comprising:
a magnetometer configured to generate a compass heading of the user device;
a location sensor configured to generate location data of the user device;
a processor circuit in communication with the magnetometer and the location sensor and configured to execute instructions causing the processor circuit to:
add or subtract a mount angle of the user device within the vehicle to the compass heading, thereby producing a corrected compass heading;
determine that a course of the vehicle cannot be reliably determined from the location data;
in response to the determining that the course of the vehicle cannot be reliably determined from the location data, determine the orientation of the vehicle using the corrected compass heading but not the course;
generate first map/navigation information using the orientation of the vehicle; and
display the first map/navigation information to the user.

15. The user device of claim 14 wherein the instructions cause the processor circuit to determine that the course of the vehicle cannot be reliably determined from the location data by:
determining a speed of the vehicle using motion data from the user device; and
comparing the speed of the vehicle to a predetermined speed threshold.

16. The user device of claim 14 wherein the instructions cause the processor circuit to determine that the course of the vehicle cannot be reliably determined from the location data by:
determining a course accuracy associated with the location sensor; and
comparing the course accuracy to a predetermined course accuracy threshold.

17. The user device of claim 14 wherein the instructions cause the processor circuit to:
calculate an updated mount angle of the user device within the vehicle based on the compass heading and the course; and
add or subtract the updated mount angle of the user device within the vehicle to the compass heading, thereby producing an updated corrected compass heading.

18. The user device of claim 14 wherein the instructions cause the processor circuit to:
determine an accuracy of the compass heading;
determine that the accuracy of the compass heading is below a predetermined compass accuracy threshold; and
in response to the determining that the accuracy of the compass heading is below the predetermined compass accuracy threshold:
obtain angular rate data from a gyroscope of the user device; and
update the orientation of the vehicle using the angular rate data.

19. The method of claim 1 further comprising:
determining that the course of the vehicle can now be reliably determined from the location data;
in response to the determining that the course of the vehicle can now be reliably determined from the location data, calculating the course of the vehicle based on the location data and determining the orientation of the vehicle using the course.

20. The user device of claim 14 wherein the instructions cause the processor circuit to:
determine that the course of the vehicle can now be reliably determined from the location data;
in response to the determining that the course of the vehicle can now be reliably determined from the location data, calculate the course of the vehicle based on the location data and determine the orientation of the vehicle using the course.

21. The method of claim 19 wherein determining the orientation of the vehicle using the course comprises using the course to provide corrections to an Extended Kalman Filter (EKF) used to estimate heading over time.

22. The user device of claim 20 wherein the instructions cause the processor circuit to determine the orientation of the vehicle using the course by using the course to provide corrections to an Extended Kalman Filter (EKF) used to estimate heading over time.

* * * * *